US008109719B2

(12) United States Patent
Savage

(10) Patent No.: US 8,109,719 B2
(45) Date of Patent: Feb. 7, 2012

(54) ANNULAR COMPONENT

(75) Inventor: Mark J. Savage, Bath (GB)

(73) Assignee: Rolls-Royce PLC, London (GB)

( * ) Notice: Subject to any disclaimer, the term of this patent is extended or adjusted under 35 U.S.C. 154(b) by 710 days.

(21) Appl. No.: 12/289,838

(22) Filed: Nov. 5, 2008

(65) Prior Publication Data

US 2009/0162194 A1 Jun. 25, 2009

(30) Foreign Application Priority Data

Dec. 21, 2007 (GB) .................................. 0725002.0

(51) Int. Cl.
*F01D 9/04* (2006.01)
*B23P 15/04* (2006.01)

(52) U.S. Cl. ..................... 415/191; 415/200; 415/209.3; 29/888.025; 29/889.22

(58) Field of Classification Search .................. 415/136, 415/137, 197, 209.4, 210.1, 228; 29/888.025
See application file for complete search history.

(56) References Cited

U.S. PATENT DOCUMENTS

| | | | | | |
|---|---|---|---|---|---|
| 4,365,933 | A * | 12/1982 | Langer et al. | ............. | 415/210.1 |
| 4,655,682 | A * | 4/1987 | Kunz et al. | .................... | 415/119 |
| 5,062,767 | A | 11/1991 | Worley et al. | | |
| 5,605,440 | A | 2/1997 | Bocoviz et al. | | |
| 5,616,001 | A * | 4/1997 | Boyd | ......................... | 415/209.2 |
| 7,287,957 | B2 * | 10/2007 | Jahns et al. | ................ | 415/173.7 |
| 7,824,152 | B2 * | 11/2010 | Morrison | ...................... | 415/135 |
| 2002/0127097 | A1 * | 9/2002 | Darolia et al. | ................ | 415/137 |
| 2003/0185673 | A1 | 10/2003 | Matsumoto et al. | | |

FOREIGN PATENT DOCUMENTS

| | | | |
|---|---|---|---|
| BE | 886312 | A1 | 5/1981 |
| JP | A-60-91008 | | 5/1985 |
| WO | WO 97/22843 | A1 | 6/1997 |

* cited by examiner

*Primary Examiner* — Stephen W Smoot
(74) *Attorney, Agent, or Firm* — Oliff & Berridge, PLC

(57) ABSTRACT

A stator vane assembly for a compressor has a support structure which carries and is bounded by an annular stator vane structure. The stator vane structure comprises a central bore and a sleeve carried on the central bore. The sleeve is disposed between the support structure and bore of the annular stator vane structure. The annular stator vane structure is made from a non-metallic composite material and the sleeve is made from a first material. The coefficient of thermal expansion of the non metallic material is equal to or less than the coefficient of thermal expansion of the first material.

20 Claims, 2 Drawing Sheets

ANNULAR COMPONENT

The invention relates to an annular component.

In particular it relates to an annular component having a central bore and a sleeve carried on the central bore.

Further the invention relates to a stator vane assembly for a compressor, a method of assembly of a stator vane array for a compressor and a method of manufacture of a stator vane array for a compressor.

For convenience, the expression "compressor" is used in this specification to embrace fans, which discharge gas (usually air) directly into the surroundings to provide a propulsive force, or discharged into a pipe/duct so as to be pumped along the pipe/duct, and compressors which compress a working fluid (again, usually air) which is subsequently mixed with fuel and ignited either to provide a propulsive jet flow or to drive a turbine, or a combination of the two.

Stator vane assemblies for compressors are typically made up of an annular stator vane structure having an annular outer casing joined to an annular inner casing by a plurality of stator vanes to define an annular fluid flow passage. The stator vane structure is supported on the body of the compressor by the attachment of the outer annular casing to an adjacent casing and by a support structure bounded by the inner annular casing. It is known to make such structures entirely from metal. However, while robust, metal structures are heavy. In order to lessen the weight, it is known to manufacture the stator vanes from composite materials, such as that described in U.S. Pat. No. 5,605,440 (Bocoviz et al; Eurocopter).

Composite materials (or "composites") are engineered materials made from two or more constituent materials. The materials generally have significantly different physical or chemical properties and although they bond together to form a finished structure, remain separate and distinct. For example, a composite structure may be made up of reinforcement fibres held together by a matrix, where the matrix is a resin.

In one embodiment described in U.S. Pat. No. 5,605,440 the stator vanes surround and are supported by a central support casing made of metal, which is also an inner annular casing that defines the flow path through the fan. The vanes are individually attached to the inner casing. Any expansion and contraction of the inner casing/support structure will be communicated directly to the stator vane structure. Although this may be mitigated to some degree by slotted joints between the vanes and support structure, this requires the vanes to be individually joined to the support casing to build up the array.

It is desirable to make composite structures, such as stator vane structures, as one piece and then fit the structure as one unit onto and around the support structure. However, the thermal coefficient of expansion of metal may be significantly greater than that of a non metallic composite structure. Hence a metallic support structure will expand radially outwards at a greater rate than the composite which bounds it. This may put significant stress on the composite structure, causing damage and reducing the operational life of the structure.

An object of the present invention is to provide a lightweight composite annular component which can be mounted on and around a support structure, where the thermal expansion of the support structure is reduced to maintain operational stress on the annular component below a predetermined value.

According to a first aspect of the present invention there is provided a stator vane assembly for a compressor comprising a support structure which carries and is bounded by an annular stator vane structure comprising a central bore and a sleeve carried on the central bore, wherein the sleeve is disposed between the bearing support structure and bore of the stator vane structure, characterised in that the annular stator vane structure is made from a non-metallic composite material and the sleeve is made from a first material, the coefficient of thermal expansion of the non metallic material being equal to or less than the co-efficient of thermal expansion of the first material.

Preferably the first material has a coefficient of thermal expansion which is no greater than five times the co-efficient of thermal expansion of the non metallic composite material.

Preferably the sleeve is made from a first material which has a coefficient of thermal expansion which is no greater than twice the co-efficient of thermal expansion of the non metallic composite material.

The material of the sleeve is chosen so that the maximum amount it will thermally expand over the expected operational temperature range of the annular component, and thus the amount of force exerted by the sleeve due to thermal expansion of the sleeve, will be below a predetermined value. Additionally the material of the sleeve is chosen so that the sleeve is capable of constraining a predetermined maximum hoop stress.

The metallic sleeve on the bore of the annular stator vane structure is configured to limit the thermal expansion of the support structure. The material of the sleeve is chosen such that it can limit thermal expansion forces communicated from the support structure to the annular stator vane structure to below a predetermined level. That is to say, the sleeve limits the maximum hoop stress induced by the support structure on the stator vane structure during an expected operational temperature range.

According to a second aspect of the present invention there is provided a method of assembly of a stator vane array for a compressor, characterised in that the array comprises an annular stator vane structure with a central bore made of a non metallic composite material and a sleeve made of a metallic material, the coefficient of thermal expansion of the annular stator vane structure being equal to or less than the coefficient of thermal expansion of the sleeve, the method comprising the steps of inserting the sleeve into the bore, and joining the sleeve to the bore.

The sleeve is thus fitted after the annular component (that is to say, the stator vane structure) has been formed. The relative diameters of the sleeve and bore are chosen such that the sleeve can be fitted in place without causing damage to the bore of the composite material.

According to a third aspect of the present invention there is provided a method of manufacture of a stator vane array for a compressor, characterised in that the array comprises an annular stator vane structure with a central bore made of a non metallic composite material and a sleeve made of a metallic material, the coefficient of thermal expansion of the annular stator vane structure being equal to or less than the coefficient of thermal expansion of the sleeve, the method comprising the steps of: forming a precursor of the stator vane structure from reinforcement fibres; positioning the sleeve in the bore of the precursor; introducing resin to the fibres and sleeve; and curing the resin such that the sleeve and fibres are bonded to each other.

Thus the sleeve can be bonded into place with the resin which bonds the fibres. Thus the sleeve can be fixed in place without causing damage to the composite material of the annular component.

Hereinbefore and hereafter a "stator vane structure" is taken to mean the part of the stator vane array formed from a composite material; "stator vane array" is taken to mean the stator vane structure with the protective sleeve fitted; and "stator vane assembly" is taken to mean the stator vane array and support structure assembly.

The invention will now be described, by way of example only, with reference to the accompanying drawings, in which.

Figure 1:
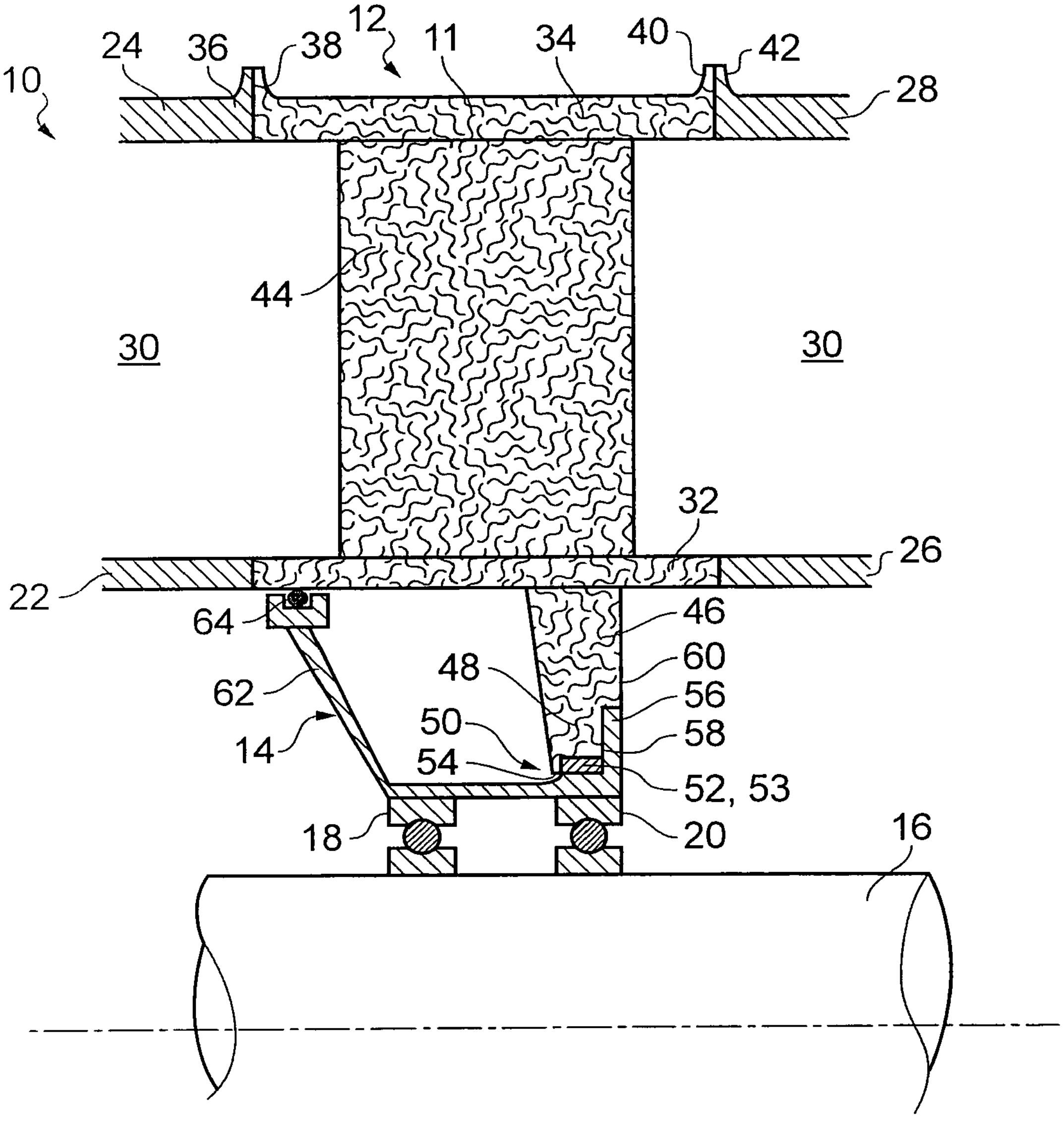
FIG. 1 shows a cross-sectional view of a section of a compressor with a stator vane array consisting of a stator vane structure and sleeve, where the stator vane array is mounted on a support structure.

A section of a compressor 10 is presented in FIG. 1. A stator vane array 12, consisting of a stator vane structure 11 and sleeve 52, is mounted on and bounds a bearing support structure 14, which in turn is disposed around a shaft 16. Bearings 18,20 fitted between the shaft 16 and bearing support structure 14 establish a load path between the shaft 16 and the vane array 12. Rotatable blades (not shown) attached to the shaft 16 are provided downstream of the stator vane array 12. An annular inner casing 22 and annular outer casing 24 upstream of the stator vane array 12, and an annular inner casing 26 and annular outer casing 28 downstream of the stator vane array 12, define an annular flow path 30. The stator vane array 12 has annular inner and outer casing walls 32,34 which are joined to the inner 22,26 and outer 24,28 casing walls respectively. In the embodiment shown the outer casing walls 24,34,28 are provided with flanges 36,38,40,42 for forming a joint between the casings. A static vane 44 extends between the inner casing wall 32 and outer casing wall 34.

A rim 46 towards the downstream end of the casing wall 32 extends radially inwards from the stator vane structure inner wall 32. The distal end 48 of the rim 46 defines a central bore 50 of the stator vane array 12. A sleeve 52 is provided on the radially inner surface 54 of the central bore 50. The stator vane array 12 is thus annular in shape, and defines part of the annular flow path 30, as well as the annular central bore 50. As stated above, the vane array 12 is mounted on and bounds the bearing support structure 14. The bearing support structure 14 located in the central bore 50, with the sleeve 52 disposed between the support structure 14 and the rim 46. The sleeve 52 comprises a flat portion 53 which is parallel to the annular bore 50 of the rim 46. An interference fit is formed between the material of the support structure 14 and the sleeve 52. A flange 56 extends radially outwardly from the support structure 14 and is located in a recess 58 on the downstream side 60 of the rim 46.

A support arm 62 extends upstream and radially outwards from one side of the support structure 14 towards the upstream end of the radially inner surface of the stator vane inner wall 32. A seal 64 is disposed between the arm 62 and the inner wall 32.

The walls 32,34, vane 44 and rim 46 of the stator vane structure 11 are formed as one from a non metallic composite material to form continuous ring. The sleeve 52 is made from a first material. The first material may be metallic or a fibre reinforced non metallic material. The support structure 14 is made from a second material, which may be metallic. The stator vane structure 11 has a coefficient of thermal expansion which is less than the co-efficient of thermal expansion of the first material of the sleeve 52. The thermal co-efficient of expansion of the first material of the sleeve 52 is less than that of the second material of the support structure 14. Specifically, the sleeve 52 is made from a first material which has a coefficient of thermal expansion which is no greater than ten times the co-efficient of thermal expansion of the non metallic composite material of the stator vane structure 11, thereby limiting stress due to relative thermal expansion of the sleeve 52 and vane structure 11 during operational use of the component to an acceptable value.

The thermal co-efficient of expansion of the first material of the sleeve 52 is no greater than half of that of the second material of the support structure 14, thereby limiting the radial expansion of the support structure 14 during operational use of the component to an acceptable value.

In one embodiment the non metallic composite material is made form an organic matrix composite material where carbon fibres are held in a Bismaleimide (BMI) resin, the first material is a nickel-iron alloy, for example Incoloy 904, and the second material is a titanium alloy. Alternatively Aramid (or "Kevlar®") fibres can be used instead of carbon fibres. This combination of materials provides for an assembly in which the coefficient of thermal expansion of the sleeve 52 is no greater than 5 times the co-efficient of thermal expansion of the non metallic composite material, and in which the coefficient of thermal expansion of the sleeve 52 is no greater than half that of the support structure 14.

Figure 2:
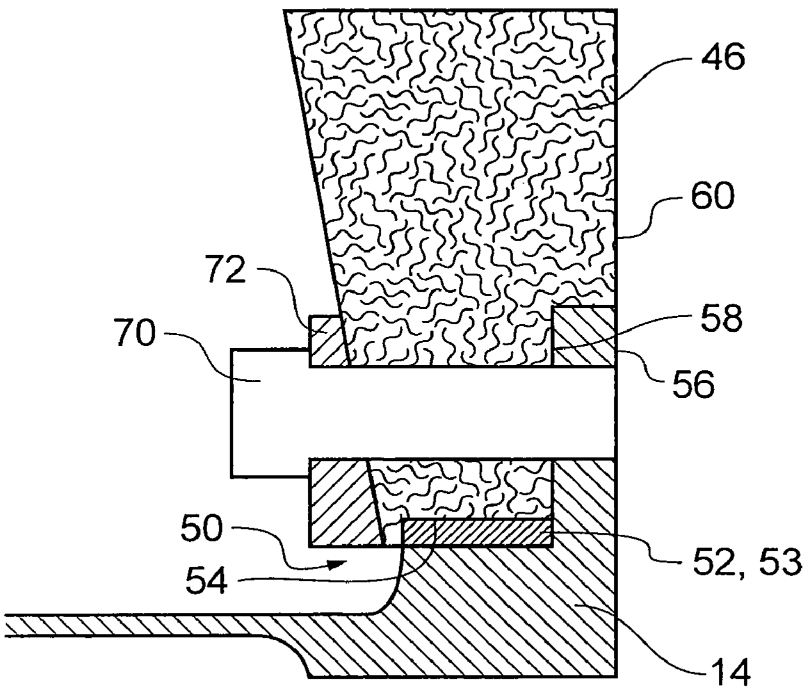
FIG. 2 shows a enlarged view and second embodiment of the interface between the stator vane array and support structure as shown in FIG. 1.
Figure 3:
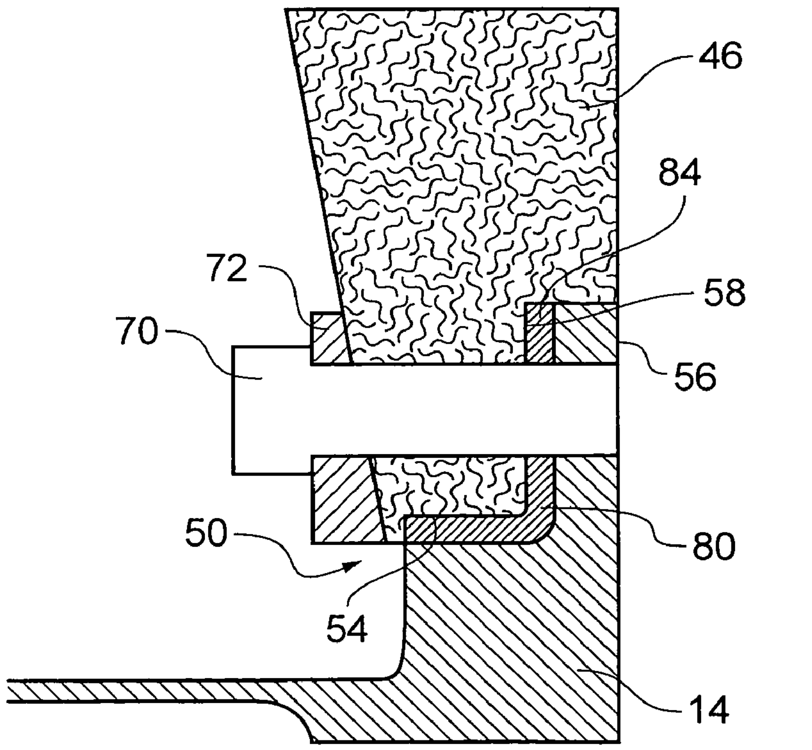
FIG. 3 shows the same view as shown in FIG. 2, in which a third embodiment of the present invention is presented.

Alternative embodiments of the interface between the rim 46 and the support structure 14 is shown in FIG. 2 and FIG. 3. In FIG. 2 a bolt 70 ties the flange 56 and rim 46 together. A wedge shaped washer 72 is provided between the bolt 70 and the rim 46 to evenly distribute the clamping force of the bolt 70 on the face of the composite material of the rim 46. The bolt locates the rim 46 axially on the support structure 14.

The embodiment shown in FIG. 3 differs only in that instead of the flat sleeve 52 of the previous embodiment, a sleeve 80 is provided which has a substantially "L" shaped cross-section. That is to say, the sleeve 80 has a flat portion 82 which is parallel to the annular bore 50 of the rim 46, and a second portion 84 which extends substantially at right angles to a flat portion 84. The second portion 84 sits between the flange 56 and the recess 58.

When the compressor 10 is operating, the shaft 16 is rotated to turn the rotor blades up and downstream of the stator vane 44. Where there is a heat conduction path to hot components, such as a turbine, the temperature of the shaft 16 and bearing support 14 will rise and consequently they will expand radially outwards. However, the composite material of the annular stator vane structure 11 has a lower coefficient of thermal expansion, and so will expand less than the support structure 14. The material of the sleeve 52,80 has a coefficient of thermal expansion which is less than that of the support structure 14. Additionally the material of the sleeve 52,80 is chosen so that it can constrain the expected maximum hoop stress induced by the support structure 14 during operation of the compressor. That is to say, the radially outward force/stress exerted on the composite material of the vane structure 11 is kept below a predetermined value by the sleeve 52,80.

The material of the sleeve 52,80 is chosen so that the maximum thermal expansion of the sleeve 52,80 over the expected operational temperature range is limited to a predetermined value, thereby limiting the amount of stress communicated to the composite material of the stator vane structure 11 by the expansion of the sleeve 52,80.

The predetermined limiting values of force/stress on the composite vane structure are dependent on the material of the composite and the desired life of the vane array 12. However, it will be appreciated that the sleeve 52,80 significantly reduces the peak force/stress induced on the composite structure 11 by the support structure 14, and therefore will significantly extend its operational life.

The choice of first and second materials allows the thermal expansion experienced in operation to be shared by the interface between the support structure 14 and the sleeve 52,80, and between the interface between the sleeve 52,80 and the bore 50 of the annular structure 11. This reduces the maximum expansion that has to be accommodated by either interface. Hence the interference level between the composite bore 50 and the metallic sleeve 52,80 can be minimised whilst maintaining an acceptable interference fit over the operational temperature range of the compressor 10.

The stator vane assembly 12 may be manufactured by forming the walls 32,34, vane 44 and rim 46 of the stator vane structure 12 as one and then inserting the sleeve 52,80 into the bore 50, and joining the sleeve 52,80 to the bore 50. An interference fit is provided between the sleeve 52,80 and the annulus defined by the bore 50. It may be required to shrink fit the sleeve 52,80 into the bore 50 so as to avoid damage to the surface 54 of the bore 50 during the insertion process. That is to say, the sleeve 52,80 can be cooled such that it contracts radially. After insertion, the sleeve 52,80 expands and forms an interference fit with the composite material. Hence an interference fit can be achieved without having to force the sleeve 52,80 over the radially inner surface 54 of the bore 50. Forcing the sleeve 52,80 over the surface 54 may cause delamination of the composite material, and thus reduce its strength. Additionally or alternatively the sleeve 52,80 is bonded into the annulus defined by the bore 50 with a suitable bonding agent.

The differing coefficients of thermal expansion allow the level of interference at room temperature between the composite structure 11 and the sleeve 52,80 to be less than it would be if the composite structure 11 were fitted directly to the support structure 14. The lower level of interference means there is less risk of damage to the composite material during installation of the sleeve 52,80.

Alternatively the stator vane array 12 may be manufactured by laying up reinforcement fibres to form a precursor of the walls 32,34, vane 44 and rim 46 of the stator vane structure 11 and positioning the sleeve 52,80 in the bore 50 of the precursor. In this context "precursor" is taken to mean an array of fibres formed into the shape of the annular stator vane structure defined by the walls 32,34, vane 44 and rim 46. The matrix, or resin, is then introduced into the precursor, bonding the fibres together in the shape of the annular component structure 11 and bonding the sleeve 52,80 into the body of the vane structure 11 to form the stator vane array 12. Thus the sleeve 52,80 can be fixed in place with the resin which bonds the fibres without risking damage to the composite material of the stator vane structure 11.

With the sleeve 52,80 in place, the stator vane assembly 12 can be assembled with the support structure 14 with a larger interference level than could be used directly between the support structure 14 and the composite material of the rim 46, since a close tolerance fit between the sleeve 52,80 and the support structure 14 will have no impact on the composite material.

Since the sleeve 52,80 is fitted to the vane structure 11 during manufacture as a permanent part of the array 12, and prevents direct contact between composite material of vane structure 11 and support structure 14, the joint between the stator vane array 12 and support structure 14 can be made and broken as many times as required with no risk of damage to the composite material.

In the embodiments shown in FIGS. 3, the second portion 84 of the sleeve 80 may be used as a jacking face to assist in disassembly of the stator vane assembly 12 and the support structure 14. Jacking screws (not shown) acting directly on the face of the recess 58 would cause significant damage, and the second portion 84 acts to protect the composite from this damage.

The invention claimed is:

1. A stator vane assembly for a compressor comprising a support structure which carries and is bounded by an annular stator vane structure comprising a central bore and a sleeve carried on the central bore, wherein the sleeve is disposed between the support structure and bore of the annular stator vane structure, characterised in that the annular stator vane structure is made from a non-metallic composite material and the sleeve is made from a first material, the coefficient of thermal expansion of the non metallic material being equal to or less than the co-efficient of thermal expansion of the first material.

2. A stator vane assembly as claimed in claim 1 wherein the coefficient of thermal expansion of the first material is no greater than ten times the coefficient of thermal expansion of the non metallic composite material.

3. A stator vane assembly as claimed in claim 1 wherein the first material has a coefficient of thermal expansion which is no greater than five times the co-efficient of thermal expansion of the non metallic composite material.

4. A stator vane assembly as claimed in claim 1 wherein the annular stator vane structure is formed as continuous ring.

5. A stator vane assembly as claimed in claim 1 wherein the sleeve comprises a flat portion which is parallel to the bore of the stator vane structure.

6. A stator vane assembly as claimed in claim 5 wherein the sleeve has a second portion which extends substantially at right angles to the flat portion to form a substantially "L" shaped cross section.

7. A stator vane assembly as claimed in claim 5 wherein the second portion extends radially outwards.

8. A stator vane assembly as claimed in claim 1 wherein stator vane structure is made form an organic matrix composite material.

9. A stator vane assembly as claimed in claim 8 wherein the organic matrix composite material is a reinforcement fibre and Bismaleimide (BMI) resin composite.

10. A stator vane assembly as claimed in claim 9 wherein the reinforcement fibre is a carbon fibre or Aramid fibre.

11. A stator vane assembly as claimed in claim 1 wherein the first material is a nickel-iron alloy.

12. A stator vane assembly as claimed in claim 1 wherein the first material is a fibre reinforced non metallic material.

13. A stator vane assembly as claimed in claim 1 wherein support structure is made from a second material, and the co-efficient of thermal expansion of the first material of the sleeve is less than the co-efficient of thermal expansion of the second material of the support structure.

14. A stator vane assembly as claimed in claim 13 wherein the thermal co-efficient of expansion of the first material of the sleeve is no greater than half that of the second material of the support structure.

15. A stator vane assembly as claimed in claim 13 wherein the second material is a titanium alloy.

16. A method of assembly of a stator vane array for a compressor, characterised in that the array comprises an annular stator vane structure with a central bore made of a non metallic composite material and a sleeve made of a metallic material, the coefficient of thermal expansion of the annular stator vane structure being equal to or less than the coefficient of thermal expansion of the sleeve, the method comprising the steps of inserting the sleeve into the bore, and joining the sleeve to the bore.

17. A method as claimed in claim 16 wherein an interference fit is provided between the sleeve and the stator vane structure.

18. A method as claimed in claim 16 wherein the sleeve is shrink fitted into the bore of the stator vane structure.

19. A method as claimed in claim 16 wherein the sleeve is bonded to the stator vane structure.

20. A method of manufacture of a stator vane array for a compressor, characterised in that the array comprises an annular stator vane structure with a central bore made of a non metallic composite material and a sleeve made of a metallic material, the coefficient of thermal expansion of the annular stator vane structure being equal to or less than the coefficient of thermal expansion of the sleeve, the method comprising the steps of:

forming a precursor of the stator vane structure from reinforcement fibres;

positioning the sleeve in the bore of the precursor;

introducing resin to the fibres and sleeve; and curing the resin such that the sleeve and fibres are bonded to each other.

* * * * *